US006793957B2

(12) United States Patent
Singh et al.

(10) Patent No.: US 6,793,957 B2
(45) Date of Patent: Sep. 21, 2004

(54) PROCESS FOR THE PREPARATION OF HERBAL WINES FROM HIMALAYAN BERRIES

(75) Inventors: Harsh Pratap Singh, Himachal Pradesh (IN); Brajinder Singh, Himachal Pradesh (IN); Varinder Singh Dhadwal, Himachal Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/105,873

(22) Filed: Mar. 25, 2002

(65) Prior Publication Data

US 2002/0168447 A1 Nov. 14, 2002

(30) Foreign Application Priority Data

Mar. 29, 2001 (WO) ................................. PCT/IN01/0058

(51) Int. Cl.$^7$ ................................................. C12G 1/00
(52) U.S. Cl. ............................ 426/592; 426/11; 426/15
(58) Field of Search ............................. 426/11, 15, 592

(56) References Cited

PUBLICATIONS winemaking.jackkeller.net/barberry.asp, 2 pages, Nov. 2, 2000.*

* cited by examiner

Primary Examiner—Curtis E. Sherrer
(74) Attorney, Agent, or Firm—Thomas R. Vigil; Welsh & Katz, Ltd.

(57) ABSTRACT

The present invention relates to a process for the production of herbal wines from Himalayan ripe berries namely as Palam Queen from ripe berries of *Berberis lycium*, Palam Belle from fruits of *Pyrus pashia* and sweet wines Rohtang Chill and Thamsar Breeze form ripe fruits of *Actinidia deliciosa* and *Syzygium jambos* found naturally growing in the Dhauladhar sub tropical belt of Himalayas in the state of Himachal Pradesh in India, the wine is a self-preserving nutritive health drink of high valuation and it is unique with respect to must composition, fruit and water quality of the region, temperature, acidity and duration of fermentation carried out, process for activation and maintenance of the yeast culture and the unique climate and soil conditions of the region offer for producing fine bouquet and taste to the product.

13 Claims, No Drawings

PROCESS FOR THE PREPARATION OF HERBAL WINES FROM HIMALAYAN BERRIES

TECHNICAL FIELD

The present invention relates to a process for the production of red herbal wine named as Palam Queen from ripe berries of *Berberis lycium,* herbal wine named Palam Belle from fruits of *Pyrus pashia* and sweet wines named Rohtang Chill and Thamsar Breeze form ripe fruits of *Actinidia deliciosa* and *Syzygium jambos* respectively.

The product is a self-preserving nutritive herbal health drink of high valuation and has much commercial value and applications. It is unique with respect to must composition, fruit, water quality of the region, temperature, acidity and duration of fermentation carried out, process for activation and maintenance of the yeast culture and the unique climate and soil conditions of the region offer for producing fine bouquet and maturation to the product.

BACKGROUND AND PRIOR ART REFERENCES

About 40 species of berberis belonging to family Barbaridacae are reported, all of which are mentioned as used medicinally. Reference may be made to the book 'Indian Medicinal Plants' by Kirtikar and Basu, vol. I. Second Edn. 1993, Periodical Experts Book Agency, D-42, Vivek Vihar, Delhi-110032, wherein it is said that all seem to have similar therapeutical properties. Among many species of berberis growing wild in the Himalayan subtropical belt at altitudes ranging from 1000–2200 m, the most commonly reported ones are *B. lycium, B. asiatica, B. arristata, B. chitria, B. osmastonii, B. insignis, B. vulgaris, B. wallichiana, B. coriaria, B. floribunda, B. himalaica, B. jaeschkeana, B. lambertii, B. tinctoria, B. virescens, B. nepalensis, B. petiolaris and B. umbellata.* Reference may be made to the book 'Glossary of Indian Medicinal Plants' by R. N. Chopra, S. L. Nayar and I. C. Chopra. CSIR, New Delhi, India, 1956, p36 and 'The Wealth of India, Raw Material, vol.2: B, 1998, p114–115, wherein species names and descriptions are given.

The plant is very hardy and grows in all types of soils and terrain in Himalayan sub-tropical belt. During summer months (June–July), the plant bears heavy fruit in the form of clusters of berries, which ripen, into lively red-violet fruits in the month of August. The ripe berries find scant attention except that some are eaten by local young and birds, otherwise the produce of the plant goes waste.

The place Palampur in the Kangra district of Himachal Pradesh amidst majestic Dhauladhar ranges of Himalayan ecosystem is a natural habitat of *Berberis lycium,* locally known as 'Kasmal' and it's fruits as 'Kasmalu'. Reference may be made to "Some Useful Wild Plants of Himachal Pradesh by Dr. O. P. Sharma, HPKV, Palampur, H. P., September, 1976, p5".

The plant is valued mainly for it's roots which are a rich source of alkaloid berberine and other related alkaloids that find application in eye diseases, as a febrifuge, in chronic diarrhoea and piles and an extract made from it's roots is locally known as 'Rasaunt' and used in opthalmia. Umbellatine, major alkaloid found in *B. lycium* root, is more effective than berberine. Reference may be made to the book 'Glossary of Indian Medicinal Plants by R. N. Chopra, S. L. Nayar and I. C. Chopra. CSIR, New Delhi, India, 1956, p36 Wherein these properties are mentioned. In Indo China, the fruit of the plant is given as a tonic in kidney troubles. Reference may be made to the book 'Indian Medicinal Plants by Kirtikar and Basu, vol. I. Second Edn. 1993, Periodical Experts Book Agency. D-42, Vivek Vihar, Delhi-110032, p.104. The fruits are used in the traditional medicine, as a tonic for liver and heart and have selective inotropic activity. Reference may be made to 'Possible mechanism of selective inotropic activity of the n-butanolic fraction from *Berberis aristata* fruit. 1999. Gilani-A H; Janbaz-K H; Nauman-Aziz; Herzig-M J U; Kazmi-M M; Choudhary-M I; Herzig-J W I. General-Pharmacology, 33:5, 407–414, wherein mention is made of it's traditional use and it's positive inotropic action on isolated cardiac tissue. Extract of fruit of berberis plant shows antihistaminic and anticholinergic activity and also possesses stomachic, astringent, antiperiodic, antipyretic and diaphoritic properties. Reference may be made to 'Antihistaminic and anticholinagic activity of berbery fruit (*Berberis vulgaris*) in the guinea pig ileum.' 1999, Shamsa-F; Ahamadiani-A; Khosrokhavar-R. Journal of Ethanopharmacology, 64:2, 161–166. and 'Preventive and curative effects of *Berberis aristata* fruits extract on paracetamol and $CCl_4$ induced hepatotoxicity. 1995. Gilani-A H; Janbaz-K H, Phytotherapy-Research. 9:7, 489–494. The fruits of berberis plant also contain minerals like P, K, Ca, Mg and ascorbic acid. Reference may be made to 'Biochemical investigation of some wild fruits of Garhwal Himalayas'. 1994. Rawat-M S M; Pant-G; Sarla-Badoni; Negi-Y S; Badoni-S. Progressive Horticulture. 26:1–2, 35–40, wherein it is said that the highest contents of crude protein (10.56%), K (1.86%), Ca (0.78%) were recorded in the ripe fruits of *B. asiatica* and fruits of *B. aristata* contained the highest content of Mg (0.73%) and *B. chitria* the highest content of crude fat (8.02%) while *B. osmastonii* the highest content of ascorbic acid (8.3%) and organic matter (95.05%) and *B. lycium* the highest content of P (0.330%).

*Pyrus pashia* plant locally known as 'kainth' belongs to family Rosaceae and grows wild in temperate Himalayas at an altitude from 50–2700 m. Its fruits are eaten by local inhabitants and birds when ripe and soft, whereas, leaves are used as cattle fodder and wood as fuel. Reference may be made to the book 'Flowers of the Himalayas' by Olegr Poluninu Adam Stainton, Delhi Oxford University Press, 1984, p121, wherein mention is made about plant's use and its growing habit. However, many useful uses of plant's edible fruits are cited in an old Hindi text which referred it as useful in treating cough, phlegm, and wind, in breathing troubles and in tuberculosis, in blood purification, in hiccups and in treating body inflammation. Reference may be made to the book 'VANAUSHADI CHANDRODAY' Kashi Sanskrit Granthamala, 161, In Encyclopaedia of India Botanics & Herbs, Chakhanbha Sanskrit Sansthan, Varansi-221001, India, p.90, wherein curative properties of the plant fruits are cited.

*Pyrus pashia,* locally known as 'Kainth', both the species one with large fruits and the other with smaller ones are commonly found here. Fruits of these plants find scant attention except eaten by local inhabitants, birds and wild bears. Reference may be made to "Some Useful Wild Plants of Himachal Pradesh" by Dr. O. P. Sharma, HPKV, Palampur, H. P., 1976, p.10.

The plant is a deciduous tree of small and medium size. It is very hardy and grows in all types of soils and terrain in the temperate Himalayas and is said to reproduce from root suckers with great freedom. The tree is favoured as a rootstock for common pear (*P. communis*) and also for the apple. There are two forms of this species: one bearing small fruits and the other, larger ones. The fruits remain hard with a firm whitish astringent flesh until November or December when the flesh begins to ripen and is edible. They may be gathered, dried and stored for later use when they are ground and mixed with the flours of either wheat (*Triticum aestivim*), mandua or ragi (*Eleusine coracana*). Ripe fruits contain total solids 25.1%; protein 1.8% and ascorbic acid 3.2 mg/100 g. As the fruits ripen, the starch is converted into sugars and at full maturity, these contain 3.3% of sugars. The wood is used for walking sticks, combs, tobacco pipes, textile mill bobbins and as fuel. Bark contains friedelin (0.5%) and β-sitosterol. Leaves contain n-hentriacontane (1%), myricyl alcohol and β-stosterol. Reference may be made to the book 'The Wealth of India', Raw Materials, vol.VIII: CSIR New Delhi publication, 1982, p.333–334 wherein above cited properties of the plant are mentioned.

*Syzygium jambos* plant belonging to family Myrtaceae is an evergreen spreading tree and is found up to an altitude of 1350 m. it is also referred to as 'Rose Apple'. The plant flowers during February–April and fruits ripen during June–August. The fruits are crisp-fleshed, rose flavoured and tasteless and are eaten fresh. These are used for making candied fruits, jellies and sauces. The fruit contains in g/100 g of edible pulp: protein 0.7, moisture 89.1, fat 0.2, fibre 1.2, and other carbohydrates 9.7. The mineral constituents present in mg/100 g pulp are: Ca 10, Mg 4, Fe 0.5, P 30, Na 34, K 50, Cu 0.01, S 13, and Cl 4. The vitamins reported in 100 g pulp are: vitamin A 235 IU, thiamin 0.01 mg, riboflavin 0.05 mg, nicotinic acid 0.4 mg, vitamin C 3 mg and folic acid 2.95 mg. The juice of freshly harvested fruit contains alanine, aspartic acid, cystine or cysteine, glutamine, threonine and tyrosine. Reference may be made to the book 'Wealth of India. Raw Materials', Vol. X, CSIR Publication, New Delhi 1976, p.104–105 and 'The Useful Plants of India', 1986. CSIR Publication, New Delhi, p. 614–615, wherein above cited uses of the fruit and its composition are mentioned. The leaves of the plant are also used in treating diabetes in the form of herbal tea in Porto Alegre, Rio Grande do Sul. Reference may be made to 'Plants employed in the treatment of diabetes mellitus: results of and ethnopharmacological survey in Porto Alegre, Brazil'. 1992. Teixeira-C C; Fuchs-F D; Blotta-R M; Costa-A P-da; Mussnich-D G; Ranquetat-G G; Da-Costa-A P, Fitoterapia, 63; 4, 320–322. The seed powder of the fruit of *S. jambos* is used in controlling blood sugar level. Reference may be made to 'Time tested household herbal remidies'. 1994. Shome-U; Rawat-A K S; Mehrotra-S. Ethnobiology in human welfare: abstracts of the fourth international congress of ethnobiology, Lucknow, Uttar pradesh, India, November, 17–21, 106. The 60% Of the volatile constituents of the edible pulp of the fruits of *S. jambos* contains 3-phenylpropan-1-ol, (E)-cinnamyl alcohol and other C6–C3 skeleton compounds which are absent in other Syzygium species. Reference may be made to 'Volatile constituents from the fruits of four Syzygium species grown in Malayasia'. 1996. Wong-K C; Lai-F Y. Flavour and Fragrance Journal. 11 : 1, 61–66.

The place Palampur located at a altitude of 1300 m and latitude of 32° 20'N and 76° 50'E in the Kangra district of Himachal Pradesh, India, amidst majestic Dhauladhar ranges of Himalayan eco system provides favourable climate and soil conditions for the growth of *Syzygium jambos*, and the fruit is locally known as 'Gulabjaman.'

*Actinidia deliciosa* plant, commonly known as "Kiwi", belonging to family Actinidiaceae is reported to be growing successfully in Belgium, France, Germany, England, USSR, Japan, New Zealand and USA. It has successfully been introduced in Himachal Pradesh in the year 1963. The plant is a dioecious climber, which flowers in May, and fruit mature in November. Fruits form one of the ingredients in Jewel Salad and are also used in decorating ice creams. Other products are wine, liquor, jam and marmalades. Chemical constituents of the fruit are moisture, 81.2%; protein, 0.79%; fat, 0.07%; carbohydrates, 17.5% and ash, 0.45%. Mineral elements found in the flesh are (mg/100 g flesh): Ca, 16; Mg, 30; P, 64; and Fe, 0.51. Vitamins include thiamine, 0.02; riboflavin, 0.05; niacin, 0.5; vitamin 'C,' 105 mg/100 g; vitamin 'A', 175 I.U. are present in the fruit pulp. Up to 300 mg/100 g Vitamin 'C' has been recorded from Indian fruit samples. A proteolytic enzyme, actidin is also present in the fruit, which prevents jellying when separated in powdered form and is used as a meat tenderizer. Moreover an ethanolic extract of the leaves of the plant is found active against gram+ve bacteria. Reference may be made to 'The Wealth of India. Raw Materials Vol-I:A', CSIR, New Delhi, 1985, p68–69, wherein description of the plant and its uses are given. The plant is a native of SouthWest China. It is a rich source of vitamin C & B, and minerals P, K and Ca. Anticancerous substances are also reported in the fruits which are used for reducing inflammation and phlegm and in reducing cough. Reference may be made to 'The exotic Kiwi has found a home in the midhills of Himachal Pradesh.' 1995. Jayant Kumar, S. S. Rana & H. S. Verma, Indian Horticulture, July Sept. pp. 28–29.

The place Palampur is located at a altitude of 1300 m and latitude 32° 20' N and 76° 50' E) in the Kangra district of Himachal Pradesh amidst majestic Dhauladhar ranges of Himalayan eco system provides favourable climate and soil conditions for the growth of *Actinidia deliciosa* more popularly known as 'Kiwi.'

The making and brewing of wines from fruits is an ancient art as old as the human civilisation. However, the wine industries around the world are based on commercially grown fruits, mostly grapes and apples and rarely on wild edible fruits which endow greater food attributes in terms of chemical constituents and other health values. Yeast culture for making wines are also maintained on fruit juices mostly on orange juice. Reference may be made to 'New Scientist', Sep. 2, 1989, p38–43 and the book 'Wine Science. Principles and Applications', 1994, by Jackson-R S. Academic Press Inc., San Diego, Calif. USA. Xiii+475 pp.

OBJECTS OF THE INVENTION

The main object of the present invention is provide a process for the production of red herbal wine named as Palam Queen from ripe berries of *Berberis lycium,* herbal wine named Palam Belle from fruits of *Pyrus pashia* and sweet wines named Rohtang Chill and Thamsar Breeze form ripe fruits of *Actinidia deliciosa* and *Syzygium jambos* respectively.

Another object of the present invention is to utilise otherwise wasted produce (fruits) of the wild plants *Berberis lycium* and related berberis species and convert these into high value nutritive health products of commercial importance for uplifting local economy.

Still another object of the present invention is to utilise otherwise wasted fruits of the wild plant *Pyrus pashia* and related wild species and converts these into high value, nutritive, herbal health products of commercial importance for uplifting local economy.

Still one more object of the present invention is to utilise otherwise small sized low grade produce (fruits) of the plant *Actinidia deliciosa* which does not find favourable market and convert them into high value nutritive health product of commercial importance for uplifting local economy.

Another object of the present invention is to utilise otherwise wasted produce (fruits) of the plant *Syzygium jambos* which, does not find any market and convert these into high value nutritive health product of commercial importance for uplifting local economy.

Yet another object of the present invention is to protect valuable biodiversity of the fragile Himalayan ecosystem by finding alternate use of the plant.

Still another object of the present invention is to utilise berberis plant fruits as a rich medium for making and maintaining large-scale wine yeast cultures for future use.

Still yet another object of the present invention is to use green tea infusion as novel source to activate dormant yeast culture for use in the 'must' for making of the product.

Further object of the present invention is to encourage the cultivation of introduced valuable crops and get sustainable high returns by value addition and product diversification for better remuneration to the farmers and save them from distress sale.

One more object of the present invention is to save the introduced valuable biodiversity in the region from the onslaught of monoculture being practised in the fragile Himalayan ecosystem by finding alternate economic use of the plant.

DETAILED DESCRIPTION OF THE INVENTION

Accordingly, the present invention provides a process for the preparation of herbal wines from ripe and semi-ripe Himalayan berries, red herbal wine named as Palam Queen from ripe berries of *Berberis lycium,* herbal wine named Palam Belle from fruits of *Pyrus pashia* and sweet wines named Rohtang Chill and Thamsar Breeze form ripe fruits of *Actinidia deliciosa* and *Syzygium jambos* respectively, said process comprising soaking the cleaned ripe berries for 30 min. to 4 hrs. in 0.1 to 1.0% sodium meta-bi-sulphate solution, draining the water and adding cold boiled water and preparing a pulp by mashing the fruit. The fruit pulp so obtained is mixed with boiled sucrose solution so as to obtain the final sucrose concentration of about 10–12% and adding yeast nutrient, pectinace enzyme and active yeast are added into mixture and allow to ferment under protected atmosphere to avoid any contamination at 17 to 30° C. and when the first active fermentation dies down and nearing the end of the fermentation, wine starts clearing which is then siphoned off and bottled in sterilised bottles, and if desired the content is decanted into another sterile container and adding sucrose solution to make the final sucrose concentration to 5%, adding active yeast solution and 0.1 to 1.0% sodium meta-bi-sulphate, and the contents are allowed to ferment for about a month at a temperature between 17 to 30° and the wine so obtained is siphoned off and stored in striled containers.

In one embodiment of the present A process for the production of red herbal wine named Palam Queen from Himalayan ripe berries of *Berberis lycium,* said process comprises soaking the cleaned ripe berries for 30 minutes to 4 hours in 0.1–1.0% sodium metabisulfite solution draining off the water, and adding cooled boiled water and preparing pulp by finely mashing the fruits, the pulp so so obtained is mixed with boiled sucrose solution so as to obtain the final sucrose concentration to 10–12% and adding, yeast nutrient, pectinase enzyme and active yeast solution are added into it the mixture and allowed to ferment for 3–5 days at 17–30° C. and when the first active fermentation dies down and the solution clarifies, it is decanted into another sterilised bottle and sucrose solution is added to make final sucrose concentration to 5% and active yeast solution is mixed and the solution topped with 0.1–1.0% sod. metabisulfite solution and continuing the second fermentation for a month at a temperature 20–25° C. when at nearing the end of the fermentation, wine starts clearing; the cleared wine so obtained is siphoned off and bottled in sterilised bottles topped with sod. metabisulfite solution previously made and the final product so made is ready to drink red wine Palam Queen having alcohol content of 10–15%.

In another embodiment of the invention provides a process for the production of herbal wine named Palam Belle from Himalayan ripe berries of *pyrus pashia,* said process comprises soaking the cleaned ripe and semi-ripe berries for 30 minutes to 4 hours in 0.1–1.0% sodium metabisulfite solution draining off the water, and adding cooled boiled water and preparing pulp by finely mashing the fruits, the pulp so obtained is mixed with boiled sucrose solution so as to obtain the final sucrose concentration to 10–12% and adding, yeast nutrient, pectinase enzyme and active yeast solution are added into it the mixture and allowed to ferment for 10–20 days at 17–30° C. and when at nearing the end of the fermentation, wine starts clearing; the cleared wine so obtained is siphoned off and bottled in sterilised bottles topped with sod. metabisulfite solution previously made and the final product so made is ready to drink wine Palam Belle having alcohol content of 6–10%.

In still another embodiment of the invention provides a process for the production of sweet wine named Rohtang Chill from Himalayan ripe berries of *Actinidia deliciosa,* said process comprises soaking the cleaned ripe berries for 30 minutes to 4 hours in 0.1–1.0% sodium metabisulfite solution draining off the water, and adding cooled boiled water and preparing pulp by finely mashing the fruits, the pulp so obtained is mixed with boiled sucrose solution so as to obtain the final sucrose concentration to 10–12% and adding, yeast nutrient, pectinase enzyme and active yeast solution are added into it the mixture and allowed to ferment for 10–25 days at 17–30° C. and when the first active fermentation dies down and the solution clarifies, it is decanted into another sterilised bottle and sucrose solution is added to make final sucrose concentration to 5% and active yeast solution is mixed and the solution topped with 0.1–1.0% sod. metabisulfite solution and continuing the second fermentation for a month at a temperature 20–25° C. when at nearing the end of the fermentation, wine starts clearing; the cleared wine so obtained is siphoned off and bottled in sterilised bottles and the final product so made is ready to drink sweet wine Rohatang Chill having alcohol content of 10–15%.

In yet another embodiment of the present invention provides a process for the production of sweet wines named Thamsar Breeze from Himalayan ripe berries of *Syzygium jambos,* said process comprises soaking the cleaned ripe berries for 30 minutes to 4 hours in 0.1–1.0% sodium metabisulfite solution draining off the water, and adding cooled boiled water and preparing pulp by finely mashing the fruits, the pulp so so obtained is mixed with boiled sucrose solution so as to obtain the final sucrose concentration to 10–12% and adding, yeast nutrient, pectinase enzyme and active yeast solution are added into it the mixture and allowed to ferment for 3–5 days at 17–30° C. and when the first active fermentation dies down and the solution clarifies, it is decanted into another sterilised bottle and sucrose solution is added to make final sucrose concentration to 5% and active yeast solution is mixed and the solution topped with 0.1–1.0% sod. metabisulfite solution and continuing the second fermentation for a month at a temperature 20–25° C. when at nearing the end of the fermentation, wine starts clearing; the cleared wine so obtained is siphoned off and bottled in sterilised bottles topped with sodium metabisulfite solution and the final product so made is ready to drink sweet wine Rohatang Chill having alcohol content of 10–15% with unique bouquet.

In yet another embodiment of the invention, the active wine yeast is prepared from mother culture of 'Vinotex' dried wine yeast available commercially from M/s Leigh Whilliams & Sons, Tattenhall, Nr. Chester, England, maintained on Berberis fruit medium activated by mixing the mother yeast solution culture in cooled green tea infusion (5 g/200 ml w/v) containing 10% sucrose.

In yet another embodiment of the invention provides a method for preparation of yeast culture medium for making active yeast consists of preparation of green tea infusion from locally made green tea (*Camellia sinensis* L/Kuntz)) taking 5 g tea in 10% sucrose in a 200 ml conical flask to which 50 mg citric acid is added, the solution is microwave at full energy for 3.0 minutes when solution comes to a boil, the flask is plugged with sterilised cotton wool and let cool to 23–25° C. when the solution culture of the mother yeast is added and the flask is re-plugged and left undisturbed for 2–3 days at 23–25° C. when the yeast gets activated for use.

In yet another embodiment of the invention, optionally, the active yeast solution is prepared once from dried yeast in this fashion while for repeated usage the dormant yeast solution culture was obtained after first active fermentation dies down in the making of wine from berberis fruits, collecting the liquid and keeping in aseptic bottles.

Yet another embodiment of invention, the quantity of yeast nutrient used is in the range of about 20 to 30 mg/l.

Yet another embodiment of invention, the amount of enzyme pectinase used is in the range of about 30–60 mg/l.

Yet another embodiment of invention, by varying the amount of sucrose at initial stages, the alcohol content of the wines are adjusted.

Yet another embodiment of invention, all the bottles, flasks and other glass and plastic wares used in making the product are sterilised by microwaving them for 3 minutes at full energy in microwave oven, while cotton wool plug is sterilised for 30 seconds and also the sterilised natural spring water from Dhauladhar mountain is prepared by microwave boiling.

In yet another embodiment of the present invention the wild *Berberis lycium* fruits are collected from Palampur region (altitude 1300 m. and latitude 32° 20' N and 76° 50' E) amidst Dhauladhar mountain range of Himalayas.

In yet another embodiment of the present invention the wild *Pyrus pashia* fruits are collected from Palampur region (altitude 1300 m and latitude 32° 20' N and 76° 50' E) amidst Dhauladhar mountain range of Himalayas and natural spring water of the region is used throughout in the making of the wine.

In yet another embodiment of the present invention other wise small sized fruits of *Actinidia deliciosa* finding poor market are collected from Palampur region (altitude 1300 m and latitude 32° 20' N and 76° 50' E) amidst Dhauladhar mountain range of Himalayas and natural spring water of the region is used throughout in the making of this sweet wine.

In yet another embodiment of the present invention the other wise fruits of *Syzygium jambos* finding no market are collected from Palampur region (altitude 1300 m and latitude 32° 20' N and 76° 50' E) amidst Dhauladhar mountain range of Himalayas and natural spring water of the region is used throughout in the making of this sweet wine.

Yet another embodiment of invention, the final product is matured fast at the salubrious and ideal climate of the Palampur region.

The wine yeast (*Saccharomyces cereviseae*) converts fruit sugar into ethanol and carbon dioxide and by the enzyme invertase secreted by it converts sucrose into two simple sugars, fructose and glucose to be converted finally into ethanol and carbon dioxide. Besides, it adds to the nutrient vitamin B-complex group in the process. As the product is undistilled, all the nutritive natural ingredients of the fruit viz. vitamins, minerals, tannins, flavonoids, aminoacids etc. remain in the drink thus making it a self preservative nutritive natural herbal health drink.

EXAMPLES

The following example is given by way of illustration and therefore should not be construed to limit the scope of the present invention.

Example 1

Berries of *Berberis lycium* are collected (1 kg) for making 2.5 l of red herbal wine (Palam Queen), washed thoroughly with running water and again soaking them for 1–2 hours in sodium metabisulfite (0.1% solution) for surface sterilisation of wild berries prior to further processing. The berries so cleaned are put in sterilised glass beaker of 5 l. capacity and cooled boiled water (1.0 l) is added to it and timely mashed with hand held grinder. The mash so obtained is transferred to a sterilised conical flask (3 l) and boiled sucrose solution (1.0 l) is added to the mash to make the final sucrose concentration to 12% and flask stoppered with sterilised cotton plug and allowed to cool to 20–25° C. To the cooled mash solution, yeast nutrient (30 mg/l) and pectinase enzyme (45 mg/l) is added and active yeast solution (100 ml) is mixed into it. The flask is plugged again with cotton wool plug and let stand for 3–5 days at 20–25° C. when the first active fermentation dies down, the solution is decanted into another sterilised bottle of 2.5 l capacity and sucrose solution (200 ml) is added to make final sucrose concentration 5% and 50 ml. active yeast solution is mixed and the solution topped with 10–15 ml sod. metabisulfite solution (0.1–1.0%) and then the bottle is corked with an air lock to continue the fermentation at a temperature range of 20–25° C. The second fermentation may continue for a month when at nearing the completion of fermentation the wine starts clearing. The cleared wine is siphoned off and bottled in sterilised coloured bottles ready to drink having alcohol content of 12–15%. The alcohol content of this herbal health drink can be increased or decreased by varying the sucrose content at the initial stages of fermentation.

Example 2

Fruits (1 kg) of *Pyrus pashia* are collected for making (4.5 l) of herbal wine (Palam Belle), washed thoroughly with running water and again soaking them for 1–2 hours in sodium metabisulfite (0.1%–1% solution) for surface sterilisation of wild fruits prior to further processing. The fruits so cleaned are put in a sterilised glass beaker of 5.0 l capacity and cooled boiled water (1.0 l) is added to it and finely mashed with hand held grinder. The mash so obtained is transferred to a sterilised conical flask (5.0 l) and boiled sucrose solution (1.0 l) containing citric acid (150 mg/l of wine) is added to the mash alongwith enough cooled boiled water to make the final sucrose concentration to 12% and total volume of the solution to 4.5 l. The flask is stoppered with sterilised cotton plug and allowed to cool to 20–25° C. To the cooled mash solution, yeast nutrient (30 mg/l) and pectinase enzyme (45 mg/l) are added and active yeast solution (100 ml) is mixed into it. The flask is plugged again with cotton wool and left undisturbed for 10–20 days at 20–25° C., till active fermentation dies down and the wine starts clearing. The cleared wine is then siphoned off and bottled in sterilised bottles and is ready to drink having an alcohol content of 6–10%. The alcohol content of this herbal health drink can however, be increased or decreased by varying sucrose percentage during the initial stages of fermentation.

Example 3

Lower grade small fruits of *Actinidia deliciosa* are collected (1.0 kg) for making 2.5 l of sweet wine (Rohtang Chill) washed thoroughly with running water and again soaking them for 1–2 hours in sodium metabisulfite (0.1% solution) for surface sterilisation of the fruits prior to further processing. The fruits so cleaned are put in sterilised glass beaker of 5.0 l capacity and cooled boiled water (1.0 l) is added to the fruit cut into small pieces and finely mashed with hand held grinder. The mash so obtained is transferred to a sterilised conical flask (3.0 lt) and boiled sucrose solution (1.0 l) is added to the mash to make the final sucrose concentration to 12% and flask stoppered with sterilised cotton plug and allowed to cool to 20–25° C. To the cooled mash solution, yeast nutrient (30 mg/l) and pectinase enzyme (45 mg/l) are added and active yeast solution (100 ml) is mixed into it. The flask is plugged again with cotton wool plug and let stand for 10–25 days at 20–25° C. when the first active fermentation dies down, the solution is decanted into another sterilized bottle of 2.5 l capacity and sucrose solution (200 ml) is added to make final sucrose concentration 5% and 50.0 ml, active yeast solution is mixed and the solution topped with 10–15 ml sod. metabisulfite solution (0.1%–1.0%) and then the bottle is corked with an air lock to continue the fermentation at a temperature range of 20–25° C. The second fermentation may continue for a month when at nearing the completion of fermentation the wine starts clearing. The cleared wine is siphoned off and bottled in sterilized bottles ready to drink having alcohol content of 10–15%. The alcohol content of this sweet health drink can be increased or decreased by varying the sucrose content at the initial stages of fermentation.

Example 4

Fruits of *Syzygium jambos* are collected (1.0 kg) for making 2.5 l of sweet wine (Thamsar Breeze) washed thoroughly with running water and again soaking them for 1–2 hours in sodium metabisulfite (0.1% solution) for surface sterilization of the fruits prior to further processing. The fruits so cleaned are put in sterilized glass beaker of 5.0 l capacity and cooled boiled water (1.0 l) is added to it and finely mashed with hand held grinder. The mash so obtained is transferred to a sterilized conical flask (3.0 lt) and boiled sucrose solution (1.0 l) is added to the mash to make the final sucrose concentration to 12% and flask stoppered with sterilized cotton plug and allowed to cool to 20–25° C. To the cooled mash solution, yeast nutrient (30 mg/l) and pectinase enzyme (45 mg/l) is added and active yeast solution (100 ml) is mixed into it. The flask is plugged again with cotton wool plug and let stand for 3–5 days at 20–25° C. When the first active fermentation dies down, the solution is decanted into another sterilized bottle of 2.5 l capacity and sucrose solution (200 ml) is added to make final sucrose concentration 5% and 50.0 ml, active yeast solution is mixed and the solution topped with 10–15 ml sod. metabisulfite solution (0.1%–1.0%) and then the bottle is corked with an air lock to continue the fermentation at a temperature range of 20–25° C. The second fermentation may continue for a month when at nearing the completion of fermentation the wine starts clearing. The cleared wine is siphoned off and bottled in sterilized coloured bottles ready to drink having alcohol content of 12–15%. The alcohol content of this sweet health drink can be increased or decreased by varying the sucrose content at the initial stages of fermentation.

The main advantages of the present invention are

1. Utilisation of higher value herbal health product, from otherwise wasted edible produce of plants *Berberis lycium, Pyrus pashia, Actinidia deliciosa, Syzygium jambos* and other species of this plant.
2. The herbal product thus formed is self preservative and valuation increases with the maturation.
3. By way of utilisation of nutritive fruits of plants to higher value natural herbal product helps preservation of otherwise threatened plant species.
4. Utilisation of source material as culture medium to maintain culture of wine yeast for future uses.
5. By way of utilization of nutritive fruits of *Actinidia deliciosa* to high value natural health product help growers to get high returns by cultivating *Actinidia deliciosa* in the land which is otherwise used for growing crops paying low returns.
6. Yeast activation is done on green tea infusion which is rich in flavonoids and this adds health attributes of tea to herbal wines and adds to it final organoleptic taste and bouquet.

What is claimed is:

1. A process for the preparation of herbal wines from ripe Himalayan berries namely, Palam Queen from ripe berries of *Berberis lycium,* Palam Belle from ripe berries of *Pyrus pashia* and sweet wines Rohtang Chill and Thamsar Breeze form ripe berries of *Actinidia deliciosa* and *Syzygium jambos,* said process comprising the steps of: cleaning the ripe berries, soaking the cleaned ripe berries for between 30 min to 4 hrs in a 0.1 to 1.0% sodium meta-bi-sulphate water solution, draining the water solution and adding cold boiled water and preparing a berry pulp by mashing the berries, mixing the berry pulp so obtained with a boiled sucrose solution so as to obtain a final solution mixture having a sucrose concentration of between 10–12% and adding yeast nutrient, pectinase enzyme and active yeast comprising a mother yeast culture and a cooled green tea infusion into the solution mixture and allowing the solution mixture to ferment under a protected atmosphere to avoid any contamination at a temperature between 17 to 30° C., said active yeast being prepared from a mother culture of dried wine yeast, maintained on a Berberis fruit medium activated by mixing the mother yeast culture in a said cooled green tea infusion containing 10% sucrose, and, when a first active fermentation of the solution mixture dies down and nears the end of a first active fermentation, a wine starts clearing which is then siphoned off and bottled in sterilized containers, and, if desired, the content is decanted into another sterile container and a sucrose solution is added to make a final sucrose concentration in the wine of 5%, adding an active yeast solution and between 0.1 to 1.0% by-volume of sodium meta-bi-sulphate, and allowing the contents to ferment for about a month at a temperature between 17 to 30° C. followed by siphoning off the wine and storing the wine in sterilized containers.

2. A process as claimed in claim 1, wherein, the method for preparation of a yeast culture medium for making the active yeast comprises preparation of green tea infusion from green tea adding 5 g of tea to 10% sucrose in a 200 ml conical flask filled with water to which 50 mg citric acid is also added, the resulting solution is microwaved for 3.0 minutes when the solution comes to a boil, the flask then is plugged with sterilized cotton wool and the solution is allowed to cool to 23–25° C. when the solution culture of the mother yeast is added and the flask is re-plugged and left undisturbed for 2–3 days at between 23–25° C. when the yeast gets activated for use.

3. A process as claimed in claim 2 wherein the active yeast solution is prepared once from dried yeast for single use, while for repeated usage a dormant yeast solution culture is obtained after the first active fermentation dies down in the making of wine from Berberis berries and the dormant yeast culture is collected from the wine made from the Berberis berries and stored in aseptic bottles.

4. A process as claimed in claim 1 wherein, the quantity of yeast nutrient used is in the range of between 20 to 30 mg/l.

5. A process as claimed in claim 1 wherein, the amount of enzyme pectinase used is in the range of between 30–60 mg/l.

6. A process as claimed in claim 1 including the step of varying the amount of sucrose added to adjust the final alcohol content of the wine as desired.

7. A process as claimed in claims 1 wherein containers including bottles, flasks and other glass and plastic wares are used in making the wine are sterilized by microwaving the containers for 3 minutes in a microwave oven, while any cotton wool plug used to plug a container is sterilized for 30 seconds and also sterilized natural mountain spring water is used in the wine making and is prepared by microwave boiling.

8. A process as claimed in claims 1 wherein, the *Syzygium jambos* berries are collected from Palampur region altitude 1300 m and latitude 32° 20' N and 76° 50'E amidst the Dhauladhar mountain range of the Himalayas.

9. A process as claimed in claim 1 wherein, the final product is matured at and in the climate of the Palampur region of Himalayas.

10. A process for the production of red herbal wine named Palam Queen from Himalayan ripe berries of *Berberis lycium,* said process comprising the steps of: cleaning ripe Berberis berries; soaking the cleaned ripe berries between 30 minutes to 4 hours in a 0.1–1.0% sodium metabisulfite water solution so as to obtain a solution with a sucrose concentration of 10–12% and adding, yeast nutrient, pectinase enzyme and an active yeast solution prepared from a mother yeast culture and a cooled green tea infusion into the solution and mixing these ingredients, said active yeast being prepared from a mother culture of dried wine yeast, maintained on a Berberis fruit medium activated by mixing the mother yeast culture in a said cooled green tea infusion containing 10% sucrose, and allowing the solution mixture to ferment for 3–5 days at between 17–30° C. and when this first active fermentation dies down and the solution clarifies, the resulting wine solution is decanted into another sterilized bottle and a sucrose solution is added to make a final sucrose concentration of 5%, and an active yeast solution is mixed into the wine solution and the solution is topped with 0.1–1.0% of a sodium Metabisulfite solution and a second fermentation is continued for a month at a temperature between 20–25° C. and when the wine is nearing the end of the fermentation, the wine starts clearing; and the cleared wine so obtained is siphoned off and bottled in sterilized bottles topped with a sodium Metabisulfite solution previously made and the final product so made is ready to drink as red wine having an alcohol content of between 10–15%.

11. A process for the production of herbal wine named Palam Belle from Himalayan ripe and semi-ripe berries for *Pyrus pashia,* said process comprising the steps of: cleaning ripe and semi ripe *Pyrus pashia* berries, soaking the cleaned ripe and semi-ripe berries for between 30 minutes to 4 hours in a 0.1–1.0% sodium metabisulfite water solution, draining off the water, and adding cooled boiled water and preparing a pulp by finely mashing the ripe and semi ripe *Pyrus pashia* berries, the pulp so obtained being mixed with a boiled sucrose solution so as to obtain a final solution with a sucrose concentration between 10–12% and adding, yeast nutrient, pectinase enzyme and an active yeast solution prepared from a mother culture and a cooled green tea infusion into 4 the solution and mixture, said active yeast being prepared from a mother culture of dried wine yeast, maintained on a Berberis fruit medium activated by mixing the mother yeast culture in a said cooled green tea infusion containing 10% sucrose, and allowing the solution mixture to ferment for between 10–20 days at between 17–30° C. and when the solution mixture is nearing the end of the fermentation, wine starts clearing; and the cleared wine so obtained is siphoned off and bottled in sterilized bottles topped with a sodium Metabisulfite solution previously made and the final product so made is ready to drink as wine having an alcohol content of between 6–10%.

12. A process for the production of sweet wine named Tohtang Chill from Himalayan ripe berries of *Actinidia deliciosa,* said process comprising the steps of: cleaning ripe berries of *Actinidia deliciosa,* soaking the cleaned ripe berries for between 30 minutes to 4 hours in a 0.1–1.0% sodium metabisulfite water solution, draining of the water, and adding cooled boiled water and preparing pulp by finely mashing the ripe berries of *Actinidia deliciosa,* the pulp so obtained is mixed with a boiled sucrose solution so as to obtain the a final solution with a sucrose concentration to between 10–12% and adding, yeast nutrient, pectinase enzyme and active yeast solution prepared from a mother culture and a cooled green tea infusion into the solution and mixture, said active yeast being prepared from a mother culture of dried wine yeast, maintained on a Berberis fruit medium activated by mixing the mother yeast culture in a said cooled green tea infusion containing 10% sucrose, and allowing the solution mixture to ferment for between 10–25 days at a temperature between 17–30° C. and when this first active fermentation dies down and the solution clarifies, wine solution is decanted into another sterilized bottle and sucrose solution is added to make a final wine solution with a sucrose concentration of 5% and an active yeast solution is mixed with the wine solution and the wine solution is topped with 0.1–1.0% sodium Metabisulfite solution and a second fermentation is continued for a month at a temperature between 20–25° C. when he wine solution is nearing the end of the second fermentation, wine starts clearing; and the cleared wine so obtained is siphoned off and bottled in sterilized bottles and the final product so made is ready to drink as sweet wine having an alcohol content of between 10–15%.

13. A process for the production of sweet wines named Thamsar Breeze from Himalayan ripe berries of *Syzygium jambos,* said process comprising the steps of: cleaning the ripe berries of *Syzygium jambos,* soaking the cleaned ripe berries between 30 minutes to 4 hours in a 0.1–1.0% sodium metabisulfite water solution, draining off the water, and adding cooled boiled water and preparing a pulp by finely mashing the ripe berries of *Syzygium jambos,* the pulp so obtained being mixed with a boiled sucrose solution so as to obtain a final solution having a sucrose concentration of between 10–12% and adding, yeast nutrient, pectinase enzyme and an active yeast solution prepared from a mother culture and a cooled green tea infusion into it the solution and mixtures said active yeast being prepared from a mother culture of dried wine yeast, maintained on a Berberis fruit medium activated by mixing the mother yeast culture in a said cooled green tea infusion containing 10% sucrose, and allowing the solution mixture to ferment for between 3–5 days at a temperature between 17–30° C. and when the first active fermentation dies down and the solution clarifies, the solution is decanted into another sterilized bottle and sucrose solution is added to make a final wine solution with a sucrose concentration of 5% and an active yeast solution is mixed with the wine solution and the solution is topped with a 0.1–1.0% sodium Metabisulfite solution and continuing a second fermentation for a month at a temperature of between 20–25° C. when the wine solution is nearing the end of this second fermentation, wine starts clearing; and the cleared wine so obtained is siphoned off and bottled in sterilized botties topped with a sodium metabisulfite solution and the final wine made is ready to drink as sweet wine having an alcohol content of between 10–15% with a unique bouquet.

* * * * *